United States Patent
Reynolds

(10) Patent No.: US 9,194,334 B1
(45) Date of Patent: Nov. 24, 2015

(54) PROPELLANT FEED SYSTEM FOR SWIRL-COAXIAL INJECTION

(71) Applicant: The United States of America as Represented by the Administrator of the National Aeronautics and Space Administration, Washington, DC (US)

(72) Inventor: David Christopher Reynolds, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 116 days.

(21) Appl. No.: 14/192,395

(22) Filed: Feb. 27, 2014

(51) Int. Cl.
  *F02K 9/00* (2006.01)
  *F02K 9/52* (2006.01)
  *F02K 9/44* (2006.01)

(52) U.S. Cl.
  CPC ..... *F02K 9/52* (2013.01); *F02K 9/44* (2013.01)

(58) Field of Classification Search
  CPC ............... F02K 9/44; F02K 9/42; F02K 9/52; F02K 9/72
  See application file for complete search history.

(56) References Cited

U.S. PATENT DOCUMENTS

| 3,001,365 | A | * | 9/1961 | Kellogg | 60/39.091 |
|---|---|---|---|---|---|
| 3,071,925 | A | * | 1/1963 | Benedict et al. | 60/258 |
| 3,242,670 | A | * | 3/1966 | Buswell | 60/258 |
| 3,675,425 | A | * | 7/1972 | Scannell et al. | 60/258 |
| 3,717,999 | A | * | 2/1973 | Wilson | 60/258 |
| 7,124,574 | B2 | | 10/2006 | Horn et al. | |
| 7,621,119 | B2 | | 11/2009 | Brown et al. | |
| 7,827,781 | B2 | | 11/2010 | Bendel | |
| 8,122,703 | B2 | | 2/2012 | Fisher | |
| 2005/0241294 | A1 | | 11/2005 | Cesaroni | |

\* cited by examiner

*Primary Examiner* — Gerald L Sung
(74) *Attorney, Agent, or Firm* — Peter J. Van Bergen; James J. McGroary

(57) ABSTRACT

A propellant feed system for swirl-coaxial injection of a liquid propellant includes a reservoir having a bottom plate and at least one tube originating in the bottom plate and extending therefrom. The tube has rectangular slits defined in and distributed tangentially and evenly about a portion of the tube that is disposed in the bottom plate. Drain holes are provided in the bottom plate and tunnels are defined in the bottom plate. Each tunnel fluidly couples one of the drain holes to a corresponding one of the rectangular slits. Each tunnel includes (i) a bend of at least 90°, and (ii) a straight portion leading to its corresponding rectangular slit wherein the straight portion is at least five times as long as a hydraulic diameter of the corresponding rectangular slit.

18 Claims, 2 Drawing Sheets

PROPELLANT FEED SYSTEM FOR SWIRL-COAXIAL INJECTION

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to propellant feed systems. More specifically, the invention is a system for achieving swirl-coaxial injection of a liquid propellant (e.g., oxidizer, fuel).

2. Description of the Related Art

Effective atomization of fluids is a vital attribute of liquid rocket injectors. One commonly-used injector is the swirl-coaxial injector. Briefly, the swirl-coaxial injector forces the mixing of propellants, e.g., a liquid oxidizer and a fuel. Typically, the oxidizer is introduced under pressure at rectangular slits formed in an injector tube such that the oxidizer swirls within the tube as it moves therethrough. The fuel is introduced into the oxidizer swirl at the end of the tube so that an atomized mixture is sprayed out. Note that the fuel and oxidizer could be switched so that the fuel was swirled rather than the oxidizer.

A traditional propellant feed system for swirl-coaxial injection of a liquid propellant is illustrated schematically in FIG. 1 and is referenced generally by numeral 10. It is to be understood that FIG. 1 is a simplistic presentation of a propellant feed system in order to clearly illustrate the drawbacks associated therewith. Since these drawbacks are related to the propellant feed/injection, only the elements related to same will be shown in FIG. 1. It is further to be understood that while FIG. 1 will be described for the swirling of a liquid oxidizer and subsequent injection of a fuel, the fuel and oxidizer could be switched to allow for swirling of the fuel and subsequent injection of the oxidizer.

In the illustrated example, feed system 10 includes a liquid oxidizer cavity 12 and a fuel cavity 14 separated from one another by an interpropellant plate 16. Passing through plate 16 are a number of injector tubes 18. Each tube 18 has a number of rectangular slits 20 (only one is shown in each tube 18) formed tangentially in the walls of tube 18 in oxidizer cavity 12. The bottom of each slit 20 lies above interpropellant plate 16.

In operation, a liquid oxidizer is supplied to oxidizer cavity 12 by means of, for example, a supply line 30. Each tube 18 with slits 20 is designed to introduce a swirl of oxidizer when slits 20 are fully immersed in an oxidizer. Accordingly, oxidizer cavity 12 with interpropellant plate 16 serves as a reservoir that holds enough liquid oxidizer to immerse slits 20. When this occurs, the oxidizer is introduced into tubes 18 at the proper pressure to create the swirl flow in the tube. Although the details are omitted in FIG. 1, fuel in fuel cavity 14 is introduced into the swirl flow at the tube's exit 18A. The mixture is then sprayed from the exit 18A of each tube 18.

The problems with propellant feed system 10 typically occur at engine shut down. Specifically, liquid oxidizer flow into oxidizer cavity 12 ceases at engine shut down. At some point, the level of liquid oxidizer in oxidizer cavity 12 falls below the top of slits 20. When this occurs, the flow volume and pressure needed to introduce the swirl flow in tubes 18 falls below the steady-state design level. This negatively impacts the swirl flow needed for proper mixing with the fuel. Specifically, when there is enough liquid oxidizer remaining in oxidizer cavity 12 to partially immerse slits 20 after engine shut down, the oxidizer "dribbles" into tube 18. This "dribble volume" (as it is known) must be expelled by vaporization of the residual fluid. Still further, since the bottom of slits 20 is above interpropellant plate 16 (to allow for brazing of tubes 18 to plate 16), a pool of liquid oxidizer remains in oxidizer cavity 12. However, if hot combustion gas reverse flows through tubes 18 (as often occurs during shutdown), the remaining pool of liquid oxidizer could combust within oxidizer cavity 12 causing a detonation "pop" that can damage the injector feed system.

SUMMARY OF THE INVENTION

Accordingly, it is an object of the present invention to provide a propellant feed system for a swirl-coaxial injector system.

Another object of the present invention is to provide a propellant feed system for a swirl-coaxial injector system that mitigates the negative effects of reduced propellant flow during shutdown.

Still another object of the present invention is to provide a propellant feed system for a swirl-coaxial injector system that eliminates a liquid oxidizer pool (or "dribble volume") at engine shutdown.

Other objects and advantages of the present invention will become more obvious hereinafter in the specification and drawings.

In accordance with the present invention, a propellant feed system for swirl-coaxial injection of a liquid propellant includes a reservoir having a bottom plate and at least one tube originating in the bottom plate and extending therefrom. The tube has a plurality of rectangular slits defined in and distributed tangentially and evenly about a portion of the tube that is disposed in the bottom plate. A plurality of drain holes are provided in the bottom plate and a plurality of tunnels are defined in the bottom plate. Each tunnel fluidly couples one of the drain holes to a corresponding one of the rectangular slits. Each tunnel includes (i) a bend of at least 90°, and (ii) a straight portion leading to its corresponding rectangular slit wherein the straight portion is at least five times as long as a hydraulic diameter of the corresponding rectangular slit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
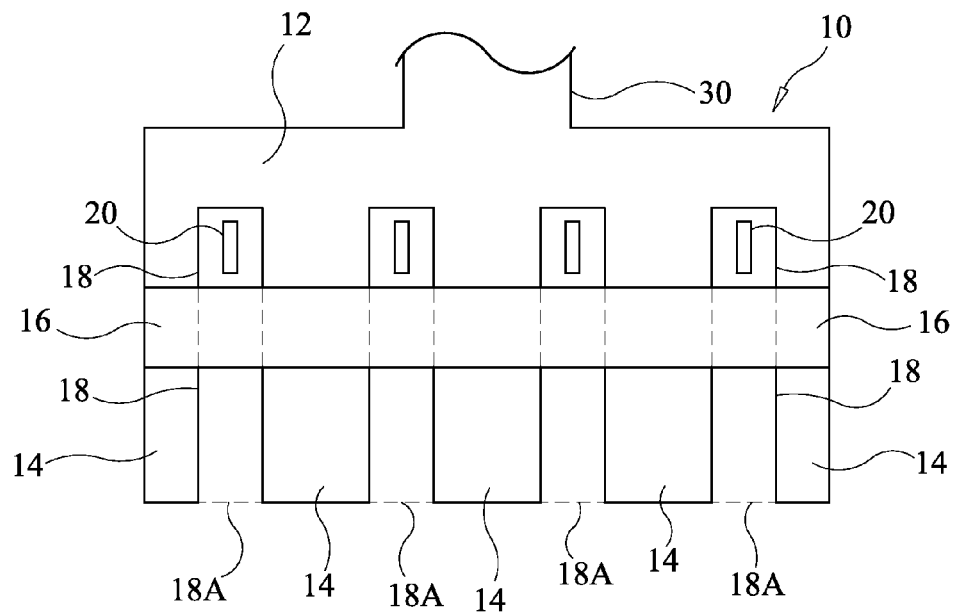
FIG. 1 is a schematic view of a conventional propellant feed system for a swirl coaxial injection of a liquid propellant.
Figure 2:
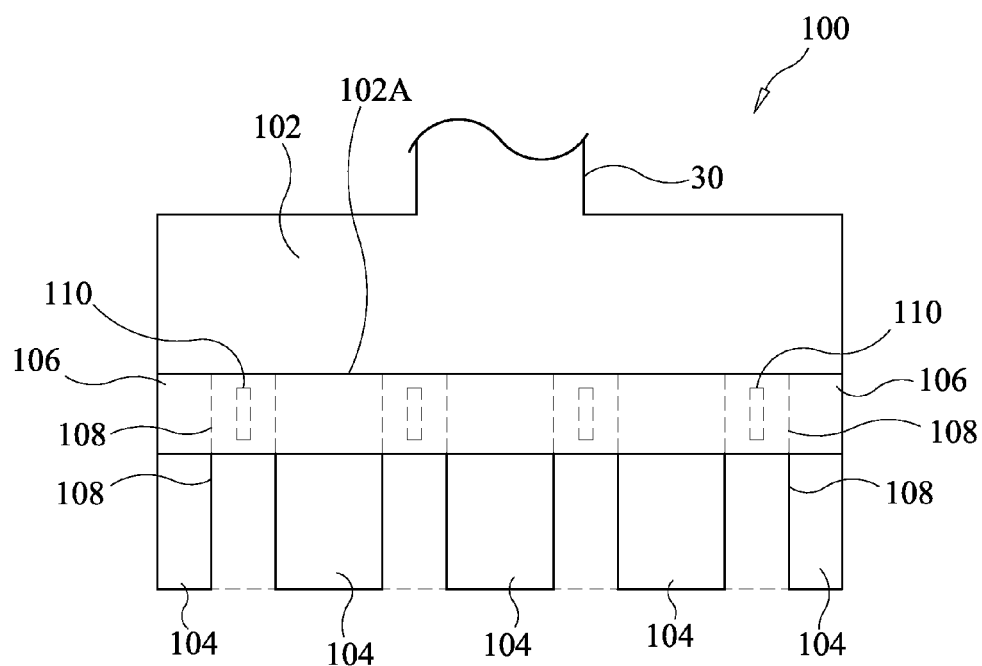
FIG. 2 is a schematic view of a propellant system for swirl-coaxial injection in accordance with an embodiment of the present invention.

Referring now to the drawings and more particularly to FIG. 2, a propellant feed system for a swirl-coaxial injection of a swirl-coaxial injection of a liquid propellant in accordance with an embodiment of the present invention is shown and is referenced generally by numeral 100. Similar to the presentation of propellant feed system 10 described above, feed system 100 is presented simplistically in order to better illustrate its novel attributes. Feed system 100 includes a liquid oxidizer cavity 102 and a fuel cavity 104 separated from one another by an interpropellant plate 106. The surface of interpropellant plate 106 interfacing with cavity 102 forms a floor 102A of cavity 102. A plurality of injector tubes 108 (e.g., cylindrical tubes) originate in plate 106 and extend down therefrom into fuel cavity 104. Briefly, the present invention provides for the introduction of liquid oxidizer into tubes 108 such that the liquid oxidizer swirls around the inside of tubes 108 as it travels down tubes 108. Furthermore, the present invention provides a structure that ensures the swirl action through engine shut down by virtually eliminating dribble volume and eliminates any residual pool of liquid oxidizer in oxidizer cavity 102 after engine shut down.

The introduction of the liquid fuel from fuel cavity 104 into tubes 108 does not form a part of the present invention and can be achieved in a variety of ways known in the art without departing from the scope of the present invention. Accordingly, the introduction of fuel into tubes 108 is omitted from this description. It is also to be understood that cavities 102/104 could be switched in terms of the propellant being supplied to tubes 108, i.e., fuel could be swirled in tubes 108. Accordingly, the present invention is more generally a propellant feed system for swirl-coaxial injection of a liquid propellant.

Liquid oxidizer is introduced into each of tubes 108 by means of slits (i.e., rectangular slits) 110 defined in tubes 108. More specifically, each tube 108 has at least two slits 110 (only one is visible for each tube 108 in FIG. 2) distributed tangentially and evenly about the circumference of each tube 108. Each slit 110 is disposed in interpropellant plate 108. Since the tube/slit construction will generally be the same for all tubes/slits, a description of one tube/slit construction will be sufficient to provide an understanding of the present invention.

Figure 3:
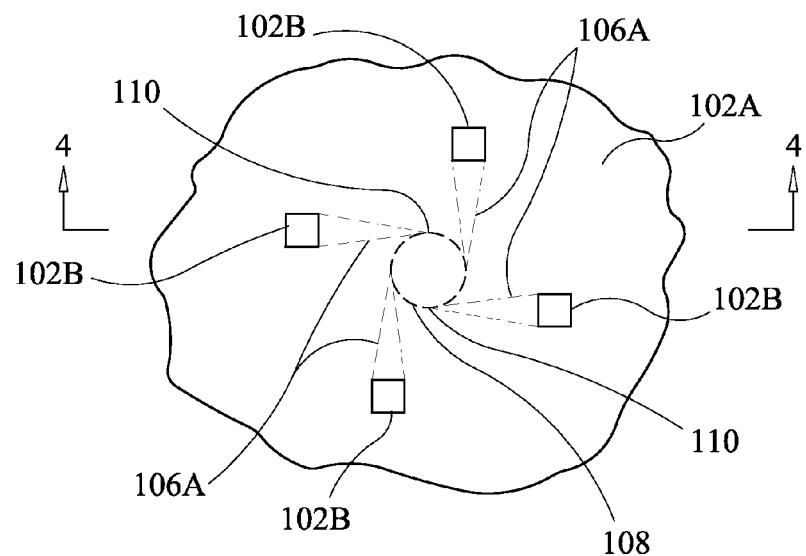
FIG. 3 is a plan view of the floor of the oxidizer cavity at one of the injector tubes in accordance with an embodiment of the present invention.
Figure 4:
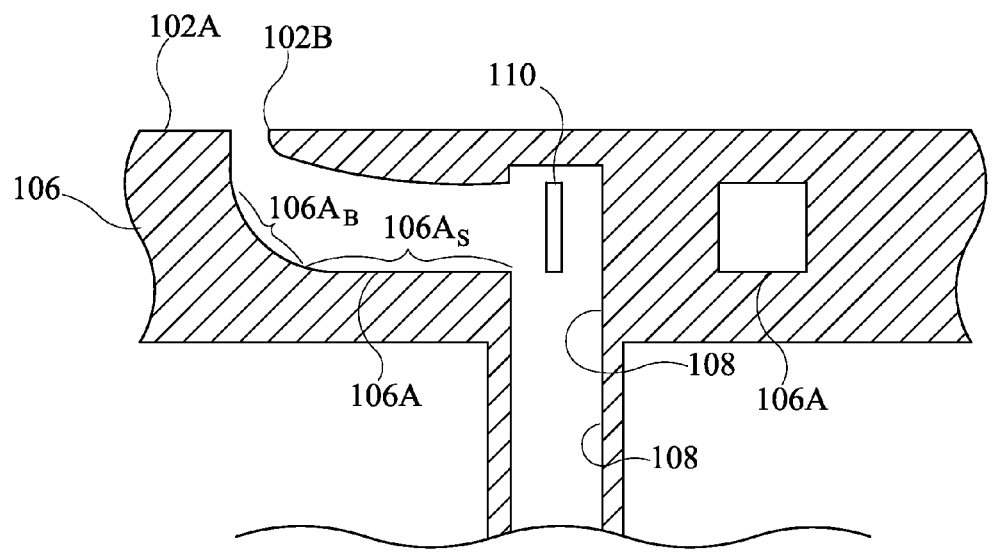
FIG. 4 is a cross-sectional view of a portion of the interpropellant plate and one of the injector tubes taken along line 4-4 in FIG. 3 in accordance with an embodiment of the present invention.

Referring now simultaneously to FIGS. 3 and 4, one tube/slit construction in accordance with an embodiment of the present invention will be described. FIG. 3 illustrates a plan view of a portion of the floor 102A of oxidizer cavity 102 in the vicinity of the top of one of tubes 108. FIG. 4 illustrates a cross-sectional view of a portion of interpropellant plate 106 in the vicinity of the top of one of tubes 108. A number of drain holes 102B are provided in floor 102A about tube 108. The number of drain holes 102B corresponds to the number of slits 110 provided in tube 108 with each drain hole 102B being fluid coupled to one slit 110 by means of a tunnel 106A defined in interpropellant plate 106. In the illustrated embodiment, four drain holes 102B and four slits 110 are associated with tube 108.

For purpose of the present invention, each drain hole/tunnel/slit combination must be constructed so that the slit is uniformly fed with a liquid propellant (e.g., oxidizer in the illustrated example) to achieve the desired swirl action in tube 108. It is known in the art that slits 110 should be thin rectangles in order to minimize the diameter of tube 108, thereby allowing the use of a greater number of tubes 108 for a given area. However, it is inefficient use of space and impractical to provide drain holes and tunnels commensurately-sized with the slits in interpropellant plate 106. The present invention addresses this issue by using rectangular (e.g., square) drain holes 102B that are evenly distributed about tube 108 and by designing tunnels 106A to transition to corresponding slits 110 in a specified manner as explained below.

Each tunnel 106A maintains a rectangular cross-section all along its length as it transitions from a square drain hole 102B to rectangular slit 110. The design approach governing the tunnel's construction also converts structural parameters to non-dimensional Nusselt and Reynolds numbers to assure that flow rates are not affected by changes in hydraulic diameter and friction factors. The hydraulic diameter "$D_H$" of slits 110 is calculated using the following equation:

$$D_H = 4A_C/P$$

where "$A_C$" is the slit's cross-sectional area and "P" is the slit's wetted perimeter. The non-dimensional Nusselt number "$N_D$" for the slit is defined by the following equation:

$$N_D = h(D_H)/k$$

where "h" is the fluid dependent convection heat transfer coefficient, and "k" is the fluid-dependent thermal conductivity.

The non-dimensional Reynolds number "Re" is defined by the following equation:

$$Re = \rho * v(D_H)/\mu$$

where "$\rho$" is the fluid-dependent density, "v" is the mean velocity of the fluid, and "$\mu$" is the fluid-dependent dynamic viscosity. The Nusselt number is reflective of the heat transfer conditions of the fluid, which may change throughout the feed system depending on the design and application. Similarly, the Reynolds number is reflective of the dynamic conditions of the fluid flowing in the feed system.

Ideally, the drain holes and slits are dimensioned such that the Nusselt and Reynolds numbers are the same at each drain hole and its corresponding slit. Consistency of these parameters throughout the corresponding tunnel assures uniform flow from drain hole to slit. Accordingly, ideal designs maintain approximate constancy of these parameters between a drain hole and its corresponding slit.

Each tunnel 106A must bend at 106A$_B$ between drain hole 102B and slit 110 in order to be aligned with slit 110. In order to assure a fully developed flow into tube 108 at slit 110, tunnel 106A must incorporate a straight portion 106A$_S$ leading to slit 110 that is at least five times the hydraulic diameter of slit 110. The bend portion 106A$_B$ should be at least 90 degrees to minimize friction losses in tunnel 106A. Note that increasing the angle of bend 106A$_B$ reduces the friction losses but increases the space needed to distribute holes 102B about tube 108.

The advantages of the present invention are numerous. The propellant feed system efficiently supplies a liquid propellant (oxidizer) to a swirl-coaxial injector to virtually eliminate dribble volume since the drain holes are positioned on the floor of the oxidizer cavity. This eliminates "pooling" of residual propellant after an engine (that is fed by the propellant feed system) shuts down. Also, the transient effects of non-uniform flow into propellant tubes 18 during shutdown are minimized because of the reduced volume of the propellant-feeding tunnels 110 as compared to the large cavity 12. Thus, the present invention provides a solution to a problem that has plagued the aerospace propulsion field for nearly 50 years. The present invention can utilize 3-D printing techniques to construct an interpropellant plate with drain holes, tunnels, and propellant-inlet slits satisfying the physical criteria defined herein.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A propellant feed system for swirl-coaxial injection of a liquid propellant, comprising:
    a reservoir having a bottom plate;
    at least one tube originating in said bottom plate and extending therefrom, said tube having a plurality of rectangular slits defined in and distributed tangentially and evenly about a portion of said tube disposed in said bottom plate;
    a plurality of drain holes in said bottom plate; and
    a plurality of tunnels defined in said bottom plate, each of said tunnels fluidly coupling one of said drain holes to a corresponding one of said rectangular slits, each of said tunnels including (i) a bend of at least 90°, and (ii) a straight portion leading to said corresponding one of said rectangular slits wherein said straight portion is at least five times as long as a hydraulic diameter of said corresponding one of said rectangular slits.

2. A propellant feed system as in claim 1, wherein Nusselt and Reynolds numbers remain approximately constant between each of said drain holes and said corresponding one of said rectangular slits.

3. A propellant feed system as in claim 1, wherein each of said drain holes is rectangular.

4. A propellant feed system as in claim 3, wherein each of said tunnels maintains a rectangular cross-section.

5. A propellant feed system as in claim 1, wherein each of said drain holes is square.

6. A propellant feed system as in claim 5, wherein each of said tunnels maintains a rectangular cross-section.

7. A propellant feed system as in claim 1, wherein said plurality of drain holes in said bottom plate comprises four square drain holes.

8. A propellant feed system as in claim 7, wherein each of said tunnels maintains a rectangular cross-section.

9. A propellant feed system for swirl-coaxial injection of a liquid propellant, comprising:
    a reservoir having a bottom plate;
    a plurality of tubes originating in said bottom plate and extending therefrom, each of said tubes having a plurality of rectangular slits defined in and distributed tangentially and evenly about a portion thereof, each said portion disposed in said bottom plate;
    a plurality of drain holes in said bottom plate distributed about and associated with each of said tubes; and
    a plurality of tunnels defined in said bottom plate, each of said tunnels fluidly coupling one of said drain holes associated with one of said tubes to a corresponding one of said rectangular slits associated with said one of said tubes, each of said tunnels including (i) a bend of at least 90°, and (ii) a straight portion leading to said corresponding one of said rectangular slits wherein said straight portion is at least five times as long as a hydraulic diameter of said corresponding one of said rectangular slits.

10. A propellant feed system as in claim 9, wherein Nusselt and Reynolds numbers remain approximately constant between each of said drain holes and said corresponding one of said rectangular slits.

11. A propellant feed system as in claim 9, wherein each of said drain holes is rectangular.

12. A propellant feed system as in claim 11, wherein each of said tunnels maintains a rectangular cross-section.

13. A propellant feed system as in claim 9, wherein each of said drain holes is square.

14. A propellant feed system as in claim 13, wherein each of said tunnels maintains a rectangular cross-section.

15. A propellant feed system as in claim 9, wherein said plurality of drain holes in said bottom plate distributed about and associated with each of said tubes comprises four square drain holes.

16. A propellant feed system as in claim 15, wherein each of said tunnels maintains a rectangular cross-section.

17. A propellant feed system for swirl-coaxial injection of a liquid propellant, comprising:
    a reservoir having a bottom plate;
    a plurality of cylindrical tubes originating in said bottom plate and extending therefrom, each of said tubes having four rectangular slits defined in and distributed tangentially and evenly about a portion thereof, each said portion disposed in said bottom plate;
    four square drain holes in said bottom plate distributed about and associated with each of said tubes; and
    a plurality of tunnels defined in said bottom plate, each of said tunnels fluidly coupling one of said four square drain holes associated with one of said tubes to a corresponding one of said rectangular slits associated with said one of said tubes, each of said tunnels including (i) a bend of at least 90°, and (ii) a straight portion leading to said corresponding one of said rectangular slits wherein said straight portion is at least five times as long as a hydraulic diameter of said corresponding one of said rectangular slits, wherein each of said tunnels maintains a rectangular cross-section.

18. A propellant feed system as in claim 17, wherein Nusselt and Reynolds numbers remain approximately constant between each of said drain holes and said corresponding one of said rectangular slits.

* * * * *